ELLEN B. VIETS & C. B. SHAW.
Apparatus for Shaping Pantaloons.
No. 163,617.                                   Patented May 25, 1875.
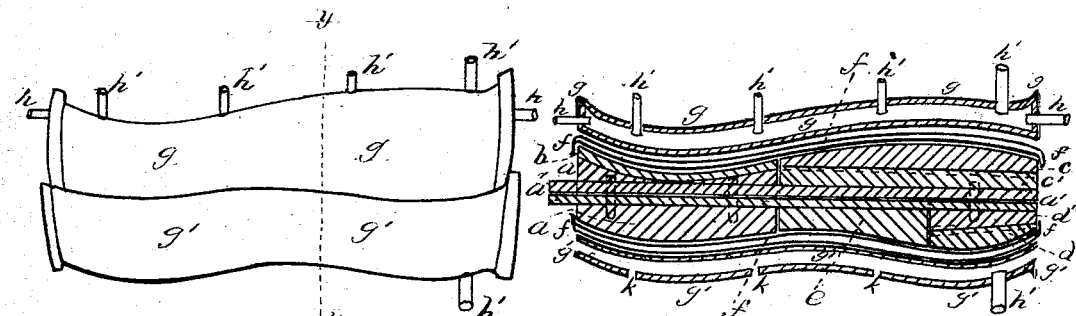
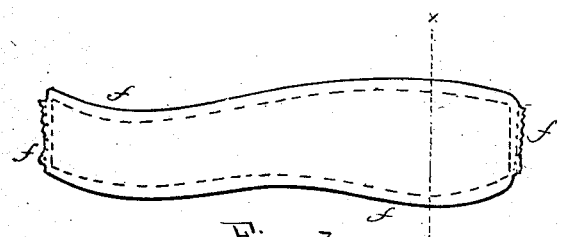    
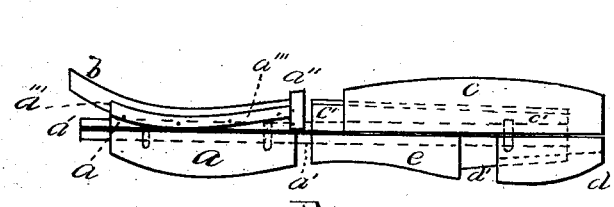    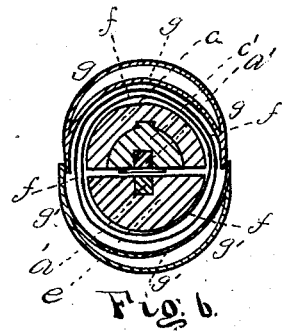

UNITED STATES PATENT OFFICE.

ELLEN B. VIETS AND CHARLES B. SHAW, OF BOSTON, MASSACHUSETTS.

IMPROVEMENT IN APPARATUS FOR SHAPING PANTALOONS.

Specification forming part of Letters Patent No. 163,617, dated May 25, 1875; application filed April 27, 1875.

*To all whom it may concern:*

Be it known that we, ELLEN B. VIETS and CHARLES B. SHAW, both of Boston, in the county of Suffolk and State of Massachusetts, have invented a new and useful Apparatus for Shaping Pantaloons; and we do hereby declare that the following is a full, clear, and exact description thereof, reference being had to the accompanying drawings, and to the letters of reference marked thereon.

In this invention the "former" is adjustable and extensible, so that pantaloons of all sizes may be placed upon it. Over the former is stretched a double elastic covering, as explained below, and the pantaloons are pressed by means of an apparatus containing heated air or steam.

It will be noticed that the steam is not applied directly to the pantaloons; neither is it contained within the former, but within the pressing apparatus above named.

The nature of our invention in detail is below set forth.

In the accompanying illustration, Figure 1 is a side view of the invention. Fig. 2 is a longitudinal section of the same. Fig. 3 is a side view of the former enveloped in the elastic covering. Fig. 4 is a cross-section on the line $x\ x$, Fig. 3. Fig. 5 is a side view of the former with its extensible parts drawn out to show their operation. Fig. 6 is a cross-section on the line $y\ y$, Fig. 1.

Similar letters of reference indicate corresponding parts.

The extensible former is best shown in Fig. 5. The part $a$ slides out upon the pieces $a'$, thus increasing the length of the former, and the toe-piece $b$ slides independently between metallic pieces $a'''$ on either side. The portion $c$ slides back upon a groove, $c'$, and the portion $d$ slides back upon groove $d'$. The part $e$ is stationary. The part $e$ and slides or grooves $c'\ d'$ are fixed to the strips or pieces $a'$.

The gaps left when the pieces $c\ d\ a$ are slid out may be bridged by plates, as is shown by $a''$. The plates may be of the proper width to cover any distance that would be left by the sliding pieces. It will thus be seen that but one former need be used for all sizes of pantaloons.

$f$ is a covering of rubber or other elastic material placed over the former, made double, and closed at the ends. By means of a tube or other contrivance air may be forced between the two layers of the covering, thus making a cushion. The object is to prevent the seams, &c., or the plate $a''$, or any other slight irregularity on the surface of the former, from showing after the pantaloons are pressed. For example: The seam around the bottoms of the pantaloons would be apt to produce a crease upon the outside after pressing were it not for the cushion or covering $f$.

After the former is adjusted to the length and size of the pantaloons to be shaped, and the pantaloons placed upon it over the covering $f$, they are ready for the application of heat.

$g\ g'$ are heating and pressing devices, made of the proper shape and size. These devices $g\ g'$ are both hollow, and may be heated up internally in various manners. By means of pipes $h\ h$ steam or hot air may be conducted into and out of their interiors or chambers, in which case the ends would be closed up. Or, by means of the pipes $h'\ h'$, heat of any kind—as by gas-jets, &c.—can be produced, and the ends left wholly or partial-open for the supply of air.

The heaters $g\ g'$ are covered externally with cloth or other material, for convenience in handling. They are also lined with cloth upon the sides next the pantaloons, which lining is saturated with water before the heater is applied to the pantaloons, so that they may be more thoroughly pressed when heat is applied. $k\ k$ represent openings for the insertion of pipes.

Having thus fully described our invention, what we claim, and desire to secure by Letters Patent, is—

1. The adjustable former, consisting of the parts $a$, $b$, $c$, $d$, and $e$, grooves $c'\ d'$, and slides $a'$, constructed and arranged substantially as and for the purpose herein set forth.

2. In combination with an adjustable former, the double elastic covering $f$, substantially as and for the purpose above named.

3. In a pantaloons-shaper, heating and pressing devices $g\ g'$, provided with appliances for the purpose of supplying heat to their interiors, and constructed substantially as for the purpose hereinbefore set forth.

4. In a pantaloons-shaper, a chambered heating apparatus having a lining upon the inner side to be saturated with water before heat is applied, substantially as above described.

ELLEN B. VIETS.
CHARLES B. SHAW.

Witnesses:
HENRY W. WILLIAMS,
J. P. RICH.